L. B. TURNER.
THERMIONIC APPARATUS APPLICABLE FOR WIRELESS TELEGRAPHY AND OTHER PURPOSES.
APPLICATION FILED FEB. 6, 1920.

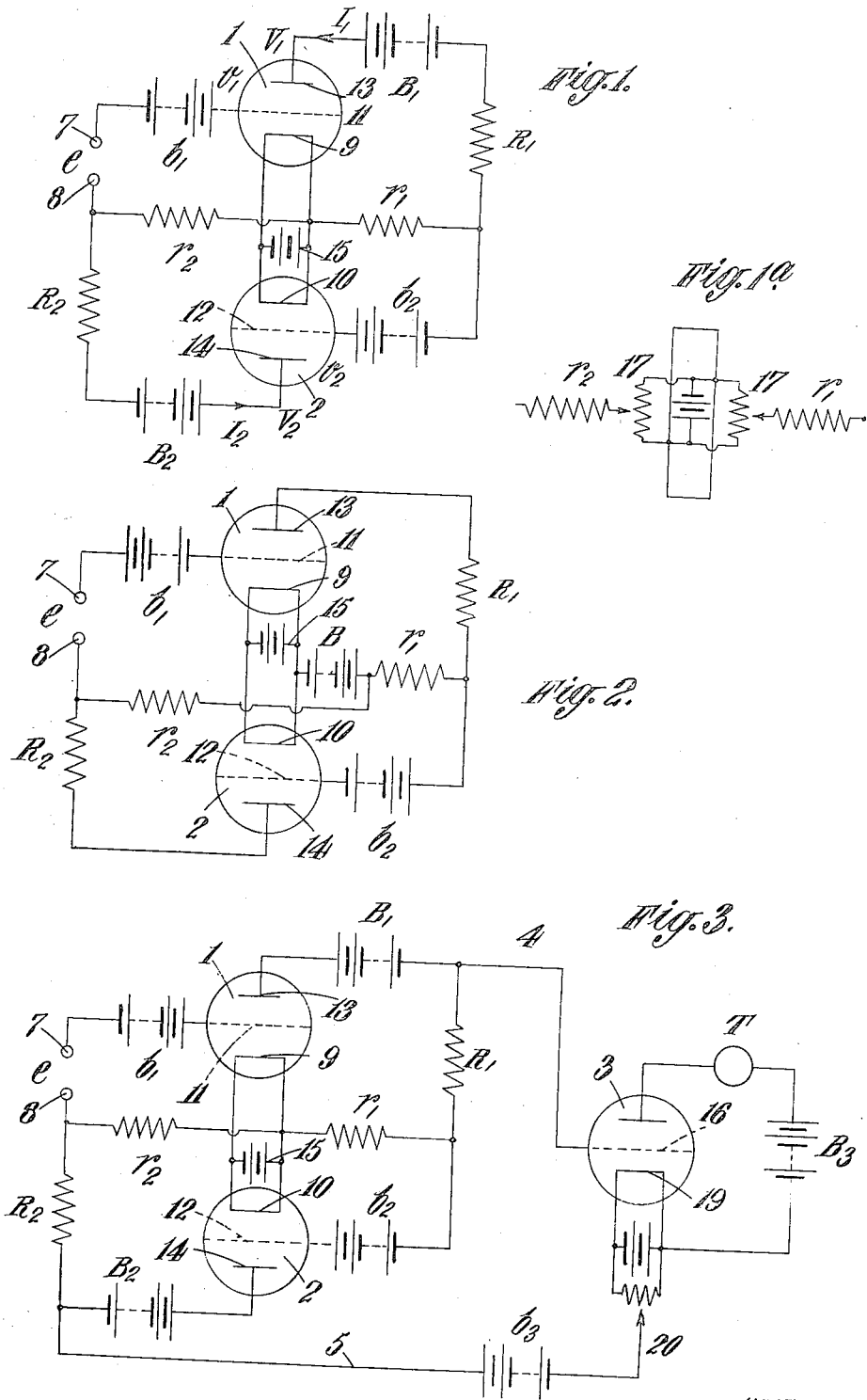

1,422,013.

Patented July 4, 1922.
2 SHEETS—SHEET 2.

INVENTOR
Laurence B. Turner
By Hubert A. Gill
Attorney

UNITED STATES PATENT OFFICE.

LAURENCE BEDDOME TURNER, OF CAMBRIDGE, ENGLAND.

THERMIONIC APPARATUS APPLICABLE FOR WIRELESS TELEGRAPHY AND OTHER PURPOSES.

1,422,013. Specification of Letters Patent. Patented July 4, 1922.

Application filed February 6, 1920. Serial No. 356,626.

*To all whom it may concern:*

Be it known that I, LAURENCE BEDDOME TURNER, a subject of the King of Great Britain, and residing at Kings College, Cambridge, in the county of Cambridge, England, have invented certain new and useful Improvements in Thermionic Apparatus Applicable for Wireless Telegraphy and Other Purposes, of which the following is a specification.

This invention relates to methods of using three-electrode ionic tubes as amplifiers or relays, and as rectifiers and generators of alternating currents. Such tubes contain a cathode or electrode otherwise made to emit a stream of corpuscles; a repeat-electrode or anode; and a control-electrode or grid; all contained in a vacuous or nearly vacuous envelope.

A simple known method of obtaining amplification by such a tube consists in impressing the incoming signal on the grid circuit, an amplified signal being thereby set up in the anode circuit. Unless there is retroaction between anode and grid circuits, the ratio between the repeat and control electromotive forces or currents is limited by the characteristics of the tube. When, however, the signal is of a periodic character and suitable retroaction is provided between the anode and grid circuits in the well known manner, the amplification may be increased indefinitely.

One way of regarding the action of such a retroactive amplifier is to conceive that negative resistances are introduced, so that the net resistance of a circuit is the algebraic sum of the inherent (positive) resistance and the added (negative) resistance due to retroaction. Under suitable conditions the net resistance is thus reducible towards zero by any desired amount. In the well known circuits for periodic currents which are used to a considerable extent in wireless telegraphy, where the retroaction is commonly by magnetic or electric induction, the resistance of a circuit is thus reducible at will for the particular frequency or frequencies to which the circuits are tuned.

Negative resistance may be introduced into a circuit by another ionic tube device, already known under the name of "dynatron," in which the result is effected, not by external retroaction between the control and repeat electrodes of the tube, but by the emission of secondary corpuscles from an electrode subjected to violent bombardment by primary corpuscles. The dynatron is applicable to periodic and to aperiodic circuits, and may be used for amplifying electromotive force or current of any form.

The present invention consists of a combination of circuits including two ionic tubes in which secondary emission of corpuscles does not occur, or plays no important part, whereby the same result of negative resistance is obtained as is obtained in the dynatron by dependance or secondary emission. The resistance of a circuit may, by means of the present invention, be approximated as closely to zero as may be desired; and the circuits may be such that substantially the only impedances concerned in the retroaction are resistances, so that the impedance is reduced as far as desired for currents of any form, including steady currents.

The result is attained by resistance retroactions between the anode of a tube and the grid of a second tube, and between the anode of the second tube and the grid of the first tube. A rise of potential of the grid in the first tube produces a rise of current to anode of the said tube, which effects a fall of potential of the grid in the second tube and a fall of current to anode therein, with a consequent rise of potential of the grid in the first tube. Thus any change of potential of grid or anode may be made more or less to sustain itself.

The principle may be put into effect in various ways, and may be applied to obtain amplification of electromotive force or current of any form, rectification of alternating or pulsating currents, control of electric circuits by variation of their resistance, and generation of sustained oscillation, in any manner in which other negative resistance devices may be used for these purposes. Moreover, the circuits according to the invention by which amplification or rectification or both are obtained, may be so adjusted that as the strength of the applied signal is increased, the effect produced rapidly falls short of being proportional to the signal; so that the circuits may be used as a limiting device very sensitive to weak signals but insensitive or less sensitive to strong signals; the saturated or insensitive condition being reached, when the values are suitably chosen, with very much weaker signals than are required to produce a corresponding limiting effect in amplifying or rectifying instruments in common use. The invention in this form may be used as a current-limiting amplifier for wireless signals, to aid in cutting out interference from atmospherics or other signals.

In order that the invention may be clearly understood and readily carried into effect, I will describe the same more fully with reference to the accompanying drawings which illustrate the invention diagrammatically and by way of example:

Figure 1 shows the method of introducing the retroaction between the two tubes, with special reference to the theoretical explanation of the invention as an amplifier of electromotive force.

Figure 1ª shows a modified detail of Figure 1.

Figure 2 shows a modification of Figure 1 in respect of the several batteries contained in the circuits.

Figures 3 and 4 show two different methods of applying such an amplifier of electromotive force to actuate a current-operated indicator such as a telephone receiver or a relay.

Figure 4:
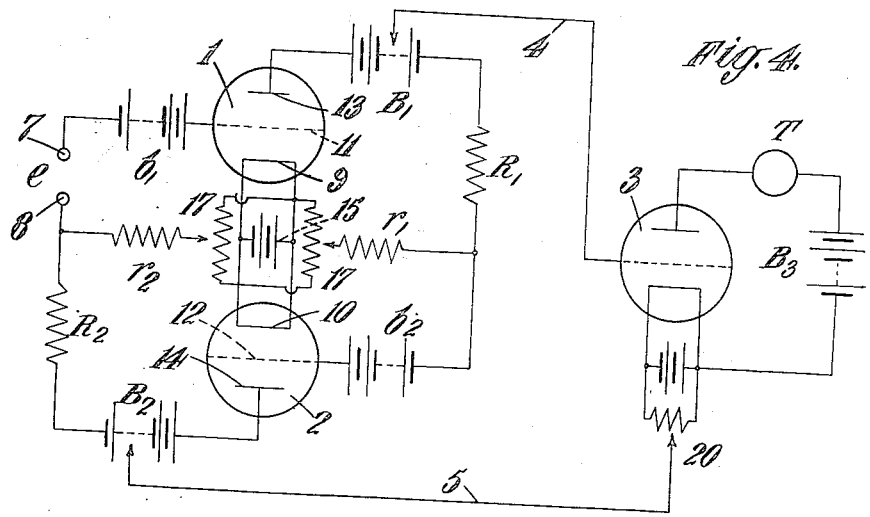

In Figure 1, 1 and 2 are the two three-electrode ionic tubes, with their filaments 9, 10, grids 11, 12, and anodes 13, 14 shown in the customary conventional manner. The filaments 9, 10 are connected together and may be heated by a common battery 15. The anode filament circuit of the tube 1 comprises the anode 13, the battery $B_1$, the two resistances $R_1$ and $r_1$, and the filament 9 all in series. Similarly the anode-filament circuit of the tube 2 comprises the anode 14, battery $B_2$, resistances $R_2$ and $r_2$, and filament 10 all in series. The filament-grid circuit of tube 1 comprises the filament 9, the resistance $r_2$, the source of signal electromotive force $e$, the battery $b_1$ and the grid 11. Similarly the filament-grid circuit of tube 2 comprises the filament 10, the resistance $r_1$, battery $b_2$ and grid 12. The potentials (with respect to the negative ends of the filaments) of the anodes and grids are denoted by $V_1$, $V_2$ and $v_1$, $v_2$, and the anode currents by $I_1$ and $I_2$. The grid potentials are adjusted to any suitable values by batteries $b_1$, $b_2$; the grid currents are preferably, but not necessarily, made zero or negligible in comparison with the anode currents. For fine adjustment of $v_1$ and $v_2$ potentiometers 17 may be used as shown in Figure 1ª.

It may be shown theoretically, and is found experimentally, that the resistance to change of anode current in one tube is reduced by interaction with the other tube by an amount which depends on the characteristics of the tubes and which increases as the product $r_1 \times r_2$ increases. If $a_1$, $a_2$ and $g_1$, $g_2$ are the familiar conductance parameters of the respective characteristic anode current-anode potential and anode current-grid potential curves for the two tubes at the representative points on those curves, and if grid currents are negligible, it may be shown theoretically that the resistance of the anode circuit of tube 1 falls from the value it would have in the absence of tube 2, viz, $$1/a_1 + r_1 + R_1$$

by an amount $$\frac{g_1 g_2 r_1 r_2}{a_1[1 + a_2(r_2 + R_2)]}$$

The net resistance may thus be reduced towards zero as much as desired by increasing the product $r_1 \times r_2$, the other quantities being maintained unchanged. Similarly the change of $(V_1 - V_2)$ produced by the small signal electromotive force $e$ may be shown to be $$e \times \frac{g_1(r_1 + R_1)[1 + a_2(r_2 + R_2)] + g_1 g_2 r_1 (r_2 + R_2)}{[1 + a_1(r_1 + R_1)][1 + a_2(r_2 + R_2)] - g_1 g_2 r_1 r_2}$$

A repeat electromotive force is thus produced in the system consisting of the signal electromotive force $e$ multiplied by a factor which increases without limit as $(r_1 \times r_2)$ is increased.

I believe these theoretical expressions to be correct, and have found them a reliable guide in calculating suitable dimensions for circuits designed to put the invention into effect; but I do not base the invention on the accuracy of the theory set forth. As a practical example of the values which may be chosen to give good results, I will quote an actual experiment carried out with the circuits of Figure 1, the two tubes 1 and 2 being of the common pattern such as is described in a paper read before the Institution of Electrical Engineers on 30th June 1919, entitled "The oscillatory valve relay." This paper has been published in abstract in the technical press, for example in the "Electrician" for 4th and 11th July 1919. $B_1$, $B_2$ were each about 95 volts; $b_1$, $b_2$ each about 4 volts; $R_1$, $R_2$ each about 55,000 ohms; $r_1 = 9,500$ ohms; $r_2 = 13,600$ ohms. When $e = 0.005$ volt, the change in $(V_1 - V_2)$ produced by $e$ was 8 volts.

Owing to the fact that changes of $v$ and $V$ are liable to alter the values of the tube characteristics $a$ and $g$, it is necessary in adjusting the circuits to take precautions against instability. One convenient method of adjusting is by varying $r_1$ and (or) $r_2$, and the batteries $b_1$ and $b_2$, while observing milliammeters registering $I_1$ and $I_2$, as indicators of instability. Fine adjustment of $v_1$ and $v_2$ can be made by means of potentiometers 17 as in Figure 4. If $(r_1 \times r_2)$ is too large, as $v_1$ or $v_2$ is gradually varied, a sudden rise of $I_1$ and fall of $I_2$ (or vice versa) occurs. $r_1$ or $r_2$ is then reduced step by step until the sudden changes of $I_1$ and $I_2$ as $v_1$ is varied cease to occur. Small changes of $v_1$ then produce large changes of $I_1$ and $I_2$ (in opposite senses), and the arrangement functions as a very sensitive amplifier of electromotive force.

When $v_1$ is set in the middle of the sensitive range, the arrangement is approximately equally sensitive to change of $v_1$ produced by positive and negative values of the signal $e$; but becomes less sensitive as $e$ is increased in magnitude. To obtain a wide sensitive range, the representative points on the characteristics of the two tubes should be similarly situated, so that changes in $a_1$ or $g_1$ are as nearly as possible compensated by changes of opposite sense in $a_2$ and $g_2$ respectively; and it is desirable to situate the points on regions of only slight curvature. One convenient way of obtaining these conditions for wide sensitive range is to keep as exact a symmetry as possible between the two tubes and their respective circuits. Conversely, when it is desired to make a sensitive range very narrow, in order to obtain the limited effect hereinbefore referred to, the representative points for the two tubes should be on regions of the characteristics where the curvatures are very unequal; therefore unsymmetrical circuits are best. When $v_1$ is set off the middle of the sensitive range, small positive and negative values of $e$ produce unequal effects, and the device may be used as a rectifier.

Figure 2 is a modification of Figure 1 showing how the two anode batteries $B_1$, $B_2$ may be replaced by a single anode battery B. This arrangement may require larger grid batteries $b_1$, $b_2$ but it should be noticed that grid batteries do not, or need not, carry current, so that a voltaic pile or other compact type of battery might be used.

The repeat electromotive force appearing as a change of potential difference between the two anodes, or between other two points separated by part or all of the anode resistances $(r_1 + R_1)$ and $(r_2 + R_2)$, may be utilized in any way; but in general no considerable current can be allowed to flow in the repeat circuit. It will often be convenient to apply the repeat electromotive force to the grid-filament circuit of a third tube 3 (Figure 3) whose anode circuit, fed by battery $B_3$ contains the indicating instrument T. for example, a telephone. The grid 16 of 3 may be brought to a suitable potential with respect to the filament 19 by means of battery $b_3$, alternatively the connections 4, 5 may be taken to tapping points on $B_1$ and (or) $B_2$ as shown in Figure 4. Fine adjustment of grid potential of 3 may be made by introducing a potentiometer 20. The tube 3 may be provided with retroaction and arranged to function as an oscillatory valve relay as described in British specification No. 130408 and in the aforesaid paper to the Institution of Electrical Engineers.

Figure 5:
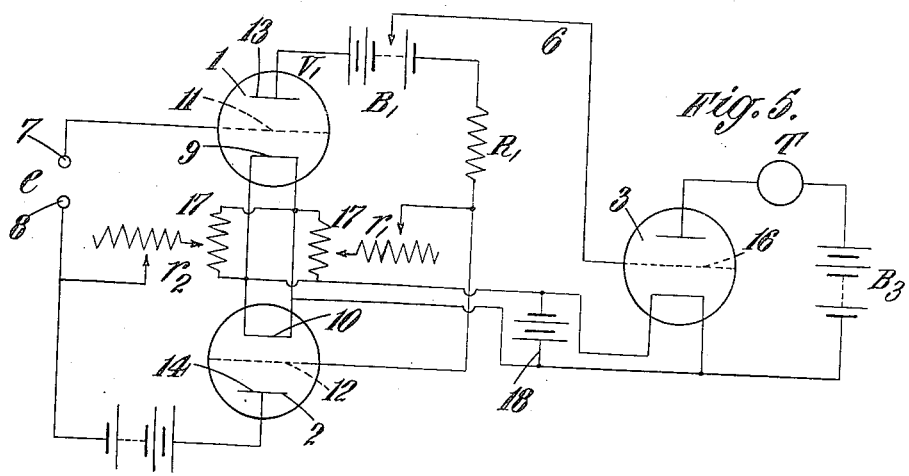
Figure 5 shows a modification of Figure 4 convenient for reducing the number of batteries necessary.

Figure 5 shows a modification of Figure 4 permitting the use of a single filament battery 18 for all three tubes. The resistance $R_2$ is omitted, and battery $B_2$ is made small or may even be omitted. $R_1$ may also be omitted and $B_1$ be made small. The amplification by either tube taken alone is then small, but owing to the retroaction the amplification of the combination may be great. Connection 6 may be made to a tapping point on $B_1$. In the arrangement of Figure 5 the repeat electromotive force is the change of $V_1$ only, and for sensitivity it is desirable that $(r_1 + R_1)$ shall much exceed $r_2$.

It has been shown hereinbefore that the net resistance of the anode circuit of either tube is dependent on the values of the parameters $a_1$ $a_2$ $g_1$ $g_2$ and that, for example, the net resistance of the circuit of battery $B_1$ is $$\left(\frac{1}{a_1} + r_1 + R_1\right) - \frac{g_1 g_2 r_1 r_2}{a_1[1 + a_2(r_1 + R_2)]}$$

If, therefore, the working points on the characteristic curves of the tubes are so chosen that the applied signal $e$ alters the values of one or more of the parameters $a_1$ $a_2$ $g_1$ $g_2$ in such a way that the negative term in this expression is much altered, the net resistance of the $B_1$ circuit is controlled by the signal. Hence the resistance of the circuit of any external apparatus inserted in the $B_1$ circuit is controlled by the signal. Such external apparatus may take the form of a galvanometer or other current-operated instrument, in which case the current through it from the battery $B_1$ will be controlled. Or an oscillatory circuit consisting of an inductance L and a capacity C in parallel as shown in Figure 6, separately excited in any way, may be inserted in series with $R_1$ or $r_1$; in which case the damping of the oscillatory circuit, and therefore the value of the oscillating current in it, will be controlled by the signal.

Any oscillatory circuit whose non-oscillatory resistance is reduced below zero will be set into sustained oscillation in a manner well understood. The invention, being a negative resistance device, is therefore capable of being applied to an oscillatory circuit in various known ways to excite oscillation in it. Figure 6 shows one method. The circuit LC is set into oscillation with approximately its natural independent frequency, when the conditions for a net negative resistance of the circuit of anode 13 have been reached as hereinbefore explained.

Figure 6:
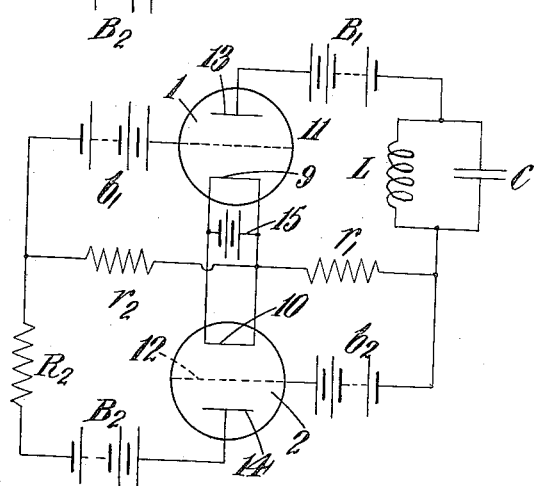
Figure 6 shows one method of using the invention to generate oscillation.

Except for circuit LC in Figure 6, the circuits generally, and in particular the resistances $r_1$, $R_1$ and $r_2$, $R_2$ have been assumed to be non-reactive. The use of inductive resistances may cause troublesome persistent oscillation and should be avoided; but experiment shows that capacitative resistance coils as used in ordinary wire telegraphy are suitable for low-frequency signals. When the invention is to be used for high-frequency currents, for example those of wireless telegraphy, the resistances should be specially free from self-capacity, so that as much as possible of the high-frequency current between the ends of a resistance shall traverse the resistance. Similarly the bulk-capacity of batteries at points of high alternating potential, such as grids and anodes, should be kept as small as possible.

It is desirable to employ batteries whose electromotive forces change but little with temperature. Weston cadmium cells or the like may be convenient for the grid batteries in Figure 2. Temperature changes of battery electromotive force, however, can be compensated more or less perfectly by the use of resistances made up to have suitable temperature coefficients.

Having thus described my invention what I claim as new and desire to secure by Letters Patent is:—

1. In thermionic apparatus, the combination of a plurality of ionic tubes, each having a filament, a grid and an anode, connections including sources of current between the anode of one tube and the grid of a second tube in said apparatus, and between the anode of said second tube and the grid of said first mentioned tube, and a common branch connection including high ohmic resistances in the anode and grid circuits of both of said tubes, whereby the anode of one tube and the grid of the second tube in said apparatus are connected, and the anode of said second tube and the grid of the first mentioned tube are connected, to form a closed circuit cascade system.

2. In thermionic apparatus the combination comprising a plurality of thermionic tubes, each of said tubes containing a filament, a grid and an anode, electrical circuits between the anode and filament and the grid and filament of each tube, means for supplying current to the electrical circuits, the anode of one tube and the grid of a second tube, and the anode of the second tube and the grid of the first tube being arranged in a closed cascade system, and a plurality of high ohmic resistances in the common branch between the two tubes.

3. In thermionic apparatus the combination comprising a plurality of thermionic tubes each having a filament, a grid and an anode, anode and grid circuits for said tubes, the grid circuit of one tube being connected to the anode circuit of a second tube, whilst the grid circuit of the second tube is connected to the anode circuit of the first tube, a plurality of high ohmic resistances, one of the resistances being included in the common branch for the anode circuit of the first tube and the grid circuit of the second tube, and one of the high ohmic resistances being included in the common branch for the anode circuit of the second tube and the grid circuit of the first tube, and means for receiving a signal in the grid circuit of one of said tubes.

4. In thermionic apparatus the combination comprising a plurality of thermionic tubes, each having a filament, a grid and an anode, anode and grid circuits for said tubes, the grid circuit of one tube being connected to the anode circuit of a second tube, whilst the grid circuit of the second tube is connected to the anode circuit of the first tube, a plurality of high ohmic resistances, one of the resistances being included in the common branch for the anode circuit of the first tube and the grid circuit of the second tube, and one of the high ohmic resistances being included in the common branch for the anode circuit of the second tube and the grid circuit of the first tube, means connecting the grid of a third tube included in the apparatus to the anode circuit of the first tube and the filament of the third tube to the anode circuit of the second tube, said connections being such that the electro-motive forces set up in the first two tubes are applied to the grid filament circuit of the third tube and effect changes in the anode circuit of said third tube, and means for receiving a signal in the grid circuit of one of the first mentioned tubes.

5. In thermionic apparatus the combination comprising a plurality of thermionic tubes, each having a filament, a grid and an anode, anode and grid circuits for said tubes, the grid circuit of one tube being connected to the anode circuit of a second tube, whilst the grid circuit of the second tube is connected to the anode circuit of the first tube, a plurality of high ohmic resistances, one of the resistances being included in the common branch for the anode circuit of the first tube and the grid circuit of the second tube, and one of the high ohmic resistances being included in the common branch for the anode circuit of the second tube and the grid circuit of the first tube, means for varying said high ohmic resistances, and means for receiving a signal in the grid circuit of one of said tubes.

6. In thermionic apparatus the combination comprising a plurality of thermionic tubes, each having a filament, a grid and an anode, anode and grid circuits for said tubes, the grid circuit of one tube being connected to the anode circuit of a second tube, whilst the grid circuit of the second tube is connected to the anode circuit of the first tube, a plurality of high ohmic resistances, one of the resistances being included in the common branch for the anode circuit of the first tube and the grid circuit of the second tube, and one of the high ohmic resistances being included in the common branch for the anode circuit of the second tube and the grid circuit of the first tube, means connecting the grid of a third tube included in the apparatus to the anode circuit of the first tube and the filament of the third tubes to the anode circuit of the second tube, recording means in the anode circuit of the third tube, and means for receiving a signal in the grid circuit of one of the first mentioned tubes.

LAURENCE BEDDOME TURNER.